United States Patent
Shroff Rama et al.

(10) Patent No.: US 11,447,685 B2
(45) Date of Patent: Sep. 20, 2022

(54) METHODS OF STABILIZING CARBONATE-BEARING FORMATIONS

(71) Applicant: Halliburton Energy Services, Inc., Houston, TX (US)

(72) Inventors: Mallikarjuna Shroff Rama, Pune (IN); Denise Nicole Benoit, Houston, TX (US); Sumit Shivshankar Konale, Pune (IN); Kristina Henkel Holan, Cypress, TX (US); Enrique Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/553,934

(22) Filed: Aug. 28, 2019

(65) Prior Publication Data
US 2021/0062068 A1    Mar. 4, 2021

(51) Int. Cl.
*C09K 8/528* (2006.01)
*C09K 8/14* (2006.01)

(52) U.S. Cl.
CPC ............... *C09K 8/528* (2013.01); *C09K 8/14* (2013.01)

(58) Field of Classification Search
CPC ..... E21B 43/162; E21B 43/164; C09K 8/582; C09K 8/58
USPC .................................................. 166/246, 269
See application file for complete search history.

(56) References Cited

U.S. PATENT DOCUMENTS

| | | | | |
|---|---|---|---|---|
| 2,238,930 A | * | 4/1941 | Chamberlain | C09K 8/5045 166/292 |
| 2,272,673 A | * | 2/1942 | Kennedy | C09K 8/58 166/270 |
| 3,318,396 A | * | 5/1967 | Tailleur | C09K 8/05 507/141 |
| 3,704,751 A | * | 12/1972 | Tate | C09K 8/78 166/307 |
| 4,366,071 A | * | 12/1982 | McLaughlin | C09K 8/608 166/275 |
| 4,410,043 A | | 10/1983 | Hall et al. | |

(Continued)

FOREIGN PATENT DOCUMENTS

CN    105295866 A  *  2/2016  ............... C09K 8/12

OTHER PUBLICATIONS

Grieser et al.: "Surface Reactive Fluid's Effect on Shale", Society of Petroleum Engineers, 2007, SPE 106815 (7 pages).
(Continued)

*Primary Examiner* — Angela M DiTrani Leff
(74) *Attorney, Agent, or Firm* — Conley Rose, P.C.; Rodney B. Carroll

(57) ABSTRACT

Compositions and methods for inhibiting dissolution of carbonates in a subterranean formation are provided. In some embodiments, the methods comprise: providing a treatment fluid that comprises a base fluid and a carbonate dissolution inhibiting additive; contacting a portion of a carbonate-bearing subterranean formation with the treatment fluid; and allowing the carbonate dissolution inhibiting additive to chemically interact with the portion of the carbonate-bearing subterranean formation to inhibit dissolution of one or more carbonate minerals in the formation, whereby the susceptibility of at least a portion of the carbonate-bearing subterranean formation to fluid-induced damage is decreased.

7 Claims, 4 Drawing Sheets

(56) References Cited

U.S. PATENT DOCUMENTS

| | | | | |
|---|---|---|---|---|
| 4,602,683 | A * | 7/1986 | Meyers | C09K 8/528 |
| | | | | 166/244.1 |
| 4,947,934 | A * | 8/1990 | Hen | C09K 8/528 |
| | | | | 166/279 |
| 5,275,739 | A * | 1/1994 | Grant | A62D 3/33 |
| | | | | 210/682 |
| 6,189,615 | B1 * | 2/2001 | Sydansk | C09K 8/512 |
| | | | | 166/270 |
| 6,495,493 | B1 | 12/2002 | Cobianco et al. | |
| 7,322,411 | B2 | 1/2008 | Brannon et al. | |
| 7,789,147 | B2 | 9/2010 | Brannon et al. | |
| 8,183,179 | B2 | 5/2012 | Garcia-Lopez De Victoria | |
| 8,393,394 | B2 | 3/2013 | Dusterhoft et al. | |
| 8,662,173 | B2 * | 3/2014 | Zhou | E21B 33/13 |
| | | | | 166/292 |
| 8,739,877 | B2 | 6/2014 | Robb et al. | |
| 2011/0120711 | A1 * | 5/2011 | James | C04B 28/18 |
| | | | | 166/275 |
| 2011/0259588 | A1 | 10/2011 | Mi et al. | |
| 2012/0175119 | A1 * | 7/2012 | James | C09K 8/508 |
| | | | | 166/294 |
| 2013/0306320 | A1 * | 11/2013 | Alotaibi | C09K 8/60 |
| | | | | 166/307 |
| 2015/0083417 | A1 * | 3/2015 | Lant | C09K 8/58 |
| | | | | 166/279 |
| 2015/0211345 | A1 | 7/2015 | Reyes et al. | |
| 2016/0356118 | A1 * | 12/2016 | Schmidt | E21B 43/283 |
| 2016/0356138 | A1 * | 12/2016 | Hughes | E21B 43/281 |
| 2019/0376376 | A1 * | 12/2019 | Chen | C09K 8/665 |
| 2020/0032126 | A1 * | 1/2020 | Ye | C09K 8/528 |

OTHER PUBLICATIONS

Mueller et al.: "Indentation Hardness for Improved Proppant Embedment Prediction in Shale Formations", Society of Petroleum Engineers, 2007, SPE-174227-MS (14 pages).

International Search Report and Written Opinion issued in related PCT Application No. PCT/US2019/048717 dated May 27, 2020, 12 pages.

* cited by examiner

METHODS OF STABILIZING CARBONATE-BEARING FORMATIONS

BACKGROUND

The present disclosure relates to compositions and methods for treating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

Hydrocarbon-producing wells are often stimulated by hydraulic fracturing treatments. In hydraulic fracturing treatments, a viscous fracturing fluid, which also functions as a carrier fluid, is pumped into a producing zone at a rate and pressure such that one or more fractures are formed in the zone. Typically, particulates, such as graded sand, suspended in a portion of the fracturing fluid are then deposited in the fractures. These particulate solids, or "proppant particulates," serve to prevent the fractures from fully closing so that conductive channels, depending on one of various methods of pumping, are formed through which produced hydrocarbons can flow.

When a well is drilled or fractured, the formation around the wellbore and fractures must sustain the load that was previously taken by the drilled-out formation and/or as cracks or fractures are formed in the formation. Formation stability is not only a mechanical problem. The interaction of chemicals in the treatment fluid with the formation also influences formation stability. There are various chemicals in the treatment fluid that can physically and chemically interact with the formations. For example, formations containing clays are prone to water-sensitivity, which can cause damage to the formation through swelling, softening, and/or generation of migrating fines. These problems can be exacerbated in resource plays that have carbonate and clay materials within the fabric of the rock yielding geochemical, mechanochemical, and/or physiochemical characteristics that differ from high permeability formations where clays reside within pores or bedding layers and are not cemented in place by carbonate minerals previously or historically developed. A well that produces hydrocarbons below an economic threshold, substantial to make the extraction and recovery process sustaining, may require a method of stimulation, typically a fracture, i.e., hydraulic fracturing. This fracture serves to connect the wellbore to the reservoir and increase the contact area exposing a larger volume of said reservoir, and facilitating more hydrocarbon transport to the wellbore. Fractures can be of natural origin, which means that these are not the consequence of any of the different operations that are implemented in the process of drilling, completing and stimulating a well and reservoir. Fractures can also develop while any of said processes and operations are implemented but such are not by design. A hydraulic fracturing operation may involve introducing a fracturing fluid which initiates a fracture perpendicular to the face of the formation, and in turn a fracture-face is now traversing the length of said fracture. The stability of the fracture-face of a formation depends at least in part on the sensitivity of the formation to water and other oilfield fluid components such as those used in fracturing. Fracture-face instability can result in proppant embedment, fines release, delamination, and extrusion. All of these can significantly reduce fracture permeability and decrease production from the formation. Furthermore, the presence of natural fractures, or pre-existing fractures, or superimposed permeability structures such as vugular conduits or vugs, can also undergo damage which would reduce the permeability and conductivity to flow.

BRIEF DESCRIPTION OF THE FIGURES

These figures illustrate certain aspects of some of the embodiments of the present disclosure, and should not be used to limit or define the claims.

Figure 1:
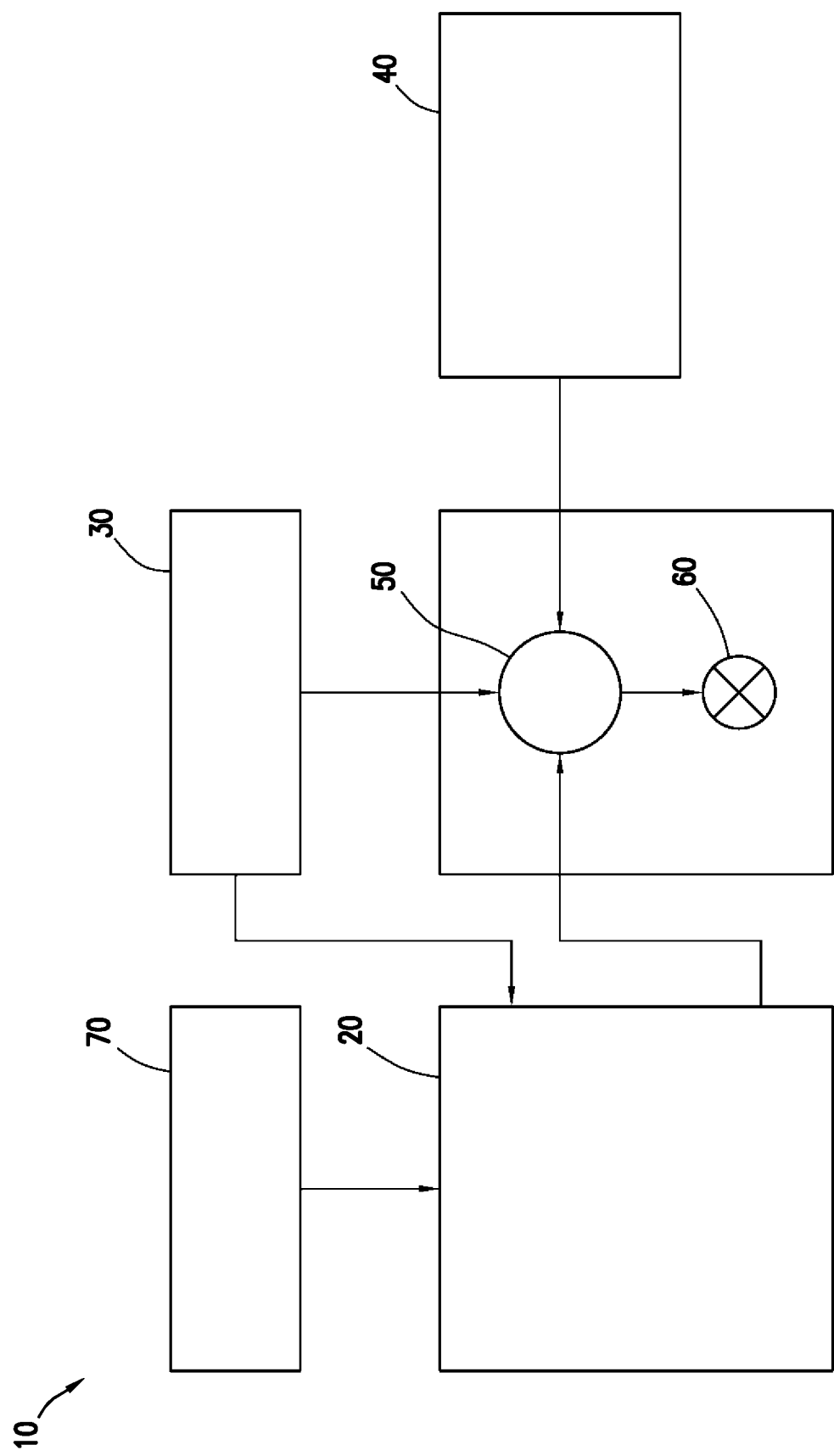
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to compositions and methods for treating subterranean formations. More particularly, the present disclosure relates to compositions and methods for inhibiting dissolution of carbonates in a subterranean formation.

The present disclosure provides carbonate dissolution inhibiting additives and methods of using such additives to inhibit dissolution of carbonates, e.g., naturally occurring carbonate minerals, in subterranean formations. The methods and compositions of the present disclosure may be used in operations and/or treatments such as fracturing treatments in any formations that contain, or are believed or expected by the operator to contain, any amount (e.g., amounts as low as 0.5 wt %) of carbonate minerals (hereinafter a "carbonate-bearing subterranean formation"). Such carbonate-bearing subterranean formations may include unconventional formations such as shales. The methods of the present disclosure generally comprise: providing a treatment fluid that comprises a base fluid and a carbonate dissolution inhibiting additive; contacting a portion of a carbonate-bearing subterranean formation with the treatment fluid; and allowing the carbonate dissolution inhibiting additive to chemically interact with the portion of the carbonate-bearing subterranean formation to inhibit dissolution of one or more carbonate minerals in the formation. The carbonate dissolution inhibiting additives of the present disclosure may comprise: one or more transition metal salts; one or more inorganic carboxylate-, phosphate-, phosphonate-, phosphono-, phosphinic-, or amino acid phosphonate additives; one or more polymeric surface active agents; one or more calcium, manganese, magnesium, strontium, and/or barium salts in a concentration at or near the saturation point of the salt in the fluid; or any combination thereof.

Among the many potential advantages to the methods and compositions of the present disclosure, only some of which are alluded to herein, the treatment fluids and carbonate dissolution inhibiting additives of the present disclosure may decrease the susceptibility of formation materials to certain kinds of damage (e.g., damage to formation clays such as swelling, softening, and/or generation of migrating fines), and thereby help maintain the strength, hardness, stability, and/or permeability of formation materials that contain carbonate minerals. In particular, these enhancements may mitigate production decline and/or improve well longevity after extended periods of time. In some embodiments, by reducing the dissolution of carbonate minerals in a formation, the methods, treatment fluids, and/or additives of the present disclosure may also reduce the exposure of other minerals in the formation that swell, dissolve, or are otherwise destabilized by exposure to well bore fluids, such as clays. This reduced exposure of other susceptible minerals may provide synergies in decreasing the susceptibility of the formation to fluid-induced damage beyond that resulting from reduced carbonate dissolution alone. In some embodiments, the methods, treatment fluids, and/or additives of the present disclosure may stabilize fracture faces in a formation, which may, among other benefits, reduce proppant embedment and mechanical damage-induced permeability loss in the fractures.

Fluid-induced fracture-face instabilities are a combination of interactions with the clay minerals as well as the dissolution of calcium carbonate. In subterranean reservoirs dissolution is known to be a function of several parameters and processes. One set of parameters for hydraulic fracturing operations involves the water, or brine, chemical composition. Given a particular chemical potential a mineral will undergo dissolution when a brine is undersaturated with respect to the ion determining species. For hydraulic fracturing the inhibition of carbonate dissolution with protection of clay hydration will protect the strength of the fracture face and retain the conductivity of natural, induced, and hydraulic fractures.

Without limiting the disclosure or claims herein to any particular mechanism or theory, the carbonate dissolution inhibiting additives of the present disclosure may inhibit the dissolution of carbonates under a variety of different mechanisms. In some embodiments, cationic moieties in the additives may form crystal lattice structures that bind to the reactive edges or other reactive sites on exposed carbonate minerals, and/or anionic moieties may react with calcium/magnesium/manganese cations present in the formation to form insoluble lattices (e.g., in a thin layer) on the surface of exposed carbonate mineral. These lattice structures may protect the carbonates from exposure to fluids in which the carbonates would otherwise dissolve. In some embodiments, certain polymeric surface active agents may form a coating or protective layer at the rock surface, which may also reduce or prevent the exposure of carbonates to fluids in which they would dissolve. In other embodiments, certain additives of the present disclosure may alter the thermodynamics of dissolution reactions to make those reactions less favorable and/or proceed more slowly. For example, certain additives of the present disclosure may produce common ion effects that may slow reaction kinetics of carbonate dissolution.

Different types of carbonate dissolution inhibiting additives of the present disclosure are discussed in further detail below. It will be recognized by persons of skill in the art with the benefit of this disclosure that two or more different types of additives discussed below may be used in the same well bore and/or operation, either substantially simultaneously and/or in the same fluid, or in different treatments in a single well bore or different stages of a single operation.

In some embodiments, the carbonate dissolution inhibiting additives of the present disclosure may comprise one or more transition metal salts; Group 2 or IIA. The cation of the transition metal salt may comprise any cationic d-block transition metals, including but not limited to iron (Fe), titanium (Ti), vanadium (V), chromium (Cr), manganese (Mn), cobalt (Co), nickel (Ni), zirconium (Zr), nyobium (Nb), molybdenum (Mo), technetium (Tc), ruthenium (Ru), rhodium (Rh), palladium (Pd), hafnium (Hf), tantalum (Ta), tungsten (W), rhenium (Re), osmium (Os), iridium (Ir), platinum (Pt), and scandium (Sc). The anion of the transition metal salt may comprise any suitable anion capable of pairing with the cationic transition metal, including but not limited to halides (e.g., chloride, bromide), carboxylates (e.g., acetate and formate), nitrate ($NO_3^-$), chlorate ($ClO_3^-$), and hypochlorate ($ClO^-$). In some embodiments, the transition metal salt may comprise a salt (or any combination of salts) that includes at least one cation and at least one anion selected from the aforementioned lists. Examples of such transition metal salts include, but are not limited to, ferric chloride, ferrous chloride, nickel chloride, manganese chloride, any derivative thereof, and any combination thereof. In some embodiments, the transition metal salts may be provided in a concentration of from about 0.1 μM to about 1M, or alternatively, about 0.1 M to about 1 M, or alternatively, about 0.15 M to about 0.5 M, or alternatively, about 0.1 mM to about 0.5 M, or alternatively, about 0.1 mM to about 0.2 M.

In some embodiments, the carbonate dissolution inhibiting additives of the present disclosure may comprise one or more inorganic carboxylate-(including mono-carboxylates, di-carboxylates, and/or multi-carboxylates), phosphate-, phosphonate-, phosphono-, phosphinic-, or amino acid phosphonate additives. The cation of the phosphate or carboxylate additive may comprise any suitable cation capable of pairing with phosphate and/or carboxylate anions, including but not limited to alkali metals (e.g., sodium, potassium, etc.), alkaline earth metals (e.g., beryllium, magnesium, calcium, barium, etc.), and the like. Examples of such phosphate or carboxylate additive include, but are not limited to, disodium oxalate, dipotassium oxalate, metal phosphates $M_nPO_4$ where M is sodium or potassium and n=1, 2 or 3. Examples of other species of phosphates that may be used include dihydrogen phosphate ($MH_2PO_4$) sodium or potassium salt, hydrogen phosphate ($M_2HPO_4$) disodium or dipotassium salt, or phosphate ($M_3PO_4$) trisodium or tripotassium salt, and any combination thereof. In some embodiments, the additives discussed in this paragraph may be provided in a concentration of from about 0.05 mol/L to about 1.0 mol/L, or alternatively, about 0.1 mol/L to about 0.25 mol/L.

In some embodiments, the carbonate dissolution inhibiting additives of the present disclosure may comprise one or more polymeric surface active agents. In these embodiments, the molecules of the polymeric surface active agents may become bound to the carbonate mineral surface, the fluid exposed layer of the polymer may change the solubility of and effects on the dissolution of the carbonate mineral. For example, if a polymeric surface active agent is bound to the surface in such a way that the hydrophilic portions of the polymer molecules are exposed to the fluid, this would increase carbonate dissolution. Conversely, if a polymeric surface active agent is bound to the surface in such a way that the hydrophilic portions of the polymer molecules are not exposed to the fluid (i.e., such that they are bound to the surface of the carbonate mineral), this would effectively passivate the surface of the mineral and inhibit the dissolution of carbonate in the mineral. Suitable polymeric surface active agent may be cationic, anionic, non-ionic, amphoteric, and/or zwitterionic in nature. Examples of polymeric surface active agents that may be suitable for use in certain embodiments of the present disclosure include, but are not limited to, salts of poly(acrylic acid), polycarboxylates, poly(maleic acid), polyitaconic acid, polysuccinic acid, polyglycolic acid, poly(acrylic acid-co-maleic acids); polyquaternary amines, polymethacrylic acids, polystyrene sulfonic acids, and their salts or copolymers of listed polymers, and any combination thereof. In some embodiments, the polymeric surface active agent may comprise a poly (alkyl methacrylate-co acrylic acid) in which the alkyl group may be a C1 to C18 alkyl group. Other examples of copolymers that may be suitable as the polymeric surface active agent may include poly(alkyl methacrylate-co acrylate-maleic acid) and polyalkyl acrylate-co-maleic acid-co-itaconic acid). In these embodiments, the ratio of alkyl methacrylate to acrylic acid may be varied. In some embodiments, the polymeric surface active agent may have a molecular weight of from about 2000 g/mol to about 10,000 g/mol.

Again, without limiting this disclosure to any particular mechanism or theory, the concentration and/or conformation of the polymeric surface active agents may impact the aforementioned effects. Thus, in the present disclosure, such polymeric surface active agents (when used) should be provided in a concentration and conformation such that the hydrophilic portions of the polymer molecules are bound to the surface of the carbonate mineral or otherwise not exposed to the fluid. In some embodiments, the polymeric surface active agents may be provided in a concentration of from about 0.05 wt % to about 10 wt %, or alternatively, from about 0.05 wt % to about 5 wt %, 0.25 wt % to about 5.0 wt %, or alternatively from about 0.5 wt % to about 2.5 wt %, or alternatively, from about 0.1 gpt to about 1 gpt. Moreover, certain polymers may have a strong pH dependency, and such may be effective over a wide range of pH, e.g., from about 0 to 13.

In some embodiments, the carbonate dissolution inhibiting additives of the present disclosure may comprise one or more of Group 2 (alkaline earth metals) such as calcium, manganese, magnesium, strontium, and/or barium salts in a concentration at or near (e.g., within about 5%) the saturation point of the salt in the fluid. In some embodiments, when the concentration of the salt is higher than the solubility product of the carbonate mineral, the presence of those salts may inhibit the dissolution of carbonates via a common ion effect with carbonate ions. This may be the case even though the same salt at lower concentrations would not reduce, or may even increase, carbonate dissolution in the same fluid. The saturation point, and thus the appropriate concentration, of the salt in a particular fluid will depend on a number of factors that a person of skill in the art will recognize with the benefit of this disclosure, including but not limited to the temperature of the fluid, the pressures in which it is used, the pH of the fluid, the presence of other additives in the fluid, and the like. Examples of suitable salts may include, but are not limited to metal halides MX (where X is a halide, such as fluoride, chloride, bromide, or iodide); metal oxyanion where the oxyanion is one of $XO_n^-$ where X is a halide and n is an integer from 1 to 4; a metal nitrate ($NO_3^-$) or nitrite ($NO_2^-$), and any combination thereof.

The treatment fluids used in the methods of the present disclosure may include any base fluid known in the art and any combinations thereof. The term "base fluid" refers to the major component of the fluid (as opposed to components dissolved and/or suspended therein), and does not indicate any particular condition or property of that fluids such as its mass, amount, pH, etc. Generally, the base fluid comprises at least one fluid in which carbonate minerals may become dissolved. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), brackish water, seawater, produced water (e.g., water produced from the same formation where the method of the present disclosure is being conducted), or any combination thereof. In certain embodiments, the density of the aqueous fluid can be adjusted, among other purposes, to provide additional particulate transport and suspension in the compositions of the present disclosure. In certain embodiments, the fluid may have a pH of below about 7 (e.g., weakly acidic pH of about 4-9), at which carbonate may be more likely to dissolve than at other pH levels. However, the treatment fluids comprising additives of the present disclosure may have a higher pH level as well, e.g., above 7. In certain embodiments, the pH of the aqueous fluid may be adjusted (e.g., by a buffer or other pH adjusting agent) to a specific level, which may depend on, among other factors, the types of carbonate dissolution inhibiting additives included in the fluid. One of ordinary skill in the art, with the benefit of this disclosure, will recognize when such density and/or pH adjustments are appropriate. In certain embodiments, the treatment fluids of the present disclosure may include a mixture of one or more base fluids and/or gases, including but not limited to emulsions (e.g., invert or oil-in-water emulsions), foams (containing a gas such as $N_2$, $CH_4$, LNG, compressed natural gas, $CO_2$), and the like.

In certain embodiments, the treatment fluids used of the present disclosure optionally may include any number of additional additives. Examples of such additional additives include, but are not limited to, additional compatible/non-interfering salts, additional surfactants, proppant particulates, diverting agents, fluid loss control additives, gas, nitrogen, carbon dioxide, methane, liquefied natural gas (LNG), surface modifying agents, tackifying agents, foamers, corrosion inhibitors, scale inhibitors, catalysts, clay control agents, biocides, friction reducers, antifoam agents, bridging agents, flocculants, $H_2S$ scavengers, oxygen ($O_2$) scavengers, metal scavengers, lubricants, viscosifiers, breakers (e.g., enzymes, oxidizers, etc.), weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application. In some embodiments, one or more carbonate dissolution inhibiting additives of the present disclosure may be provided in combination with one or more of the additives mentioned above (e.g., a clay control additive such as an amine or cationic polymer) either separately or as a single product additive to be added to a treatment fluid at the well site. When one or more carbonate dissolution inhibiting additives of the present disclosure are provided as a single product with other additives such as clay control additives, this may, among other benefits, streamline the processes for transportation and/or mixing of additives into the treatment fluid at a job site.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the carbonate dissolution inhibiting additives and/or other components of the treatment fluid may be metered directly into a base treatment fluid to form a treatment fluid. In certain embodiments, the base fluid may be mixed with the carbonate dissolution inhibiting additives and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted.

In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure. In some embodiments, the various components of the treatment fluids of the present disclosure may be mixed into the treatment fluid during some stages but not others. For example, the carbonate dissolution inhibiting additives may only be added in selected stages, among other reasons, to inhibit carbonate dissolution only during those stages. For example, in certain drilling operations, one or more of the carbonate dissolution inhibiting additives of the present disclosure may be added to a drilling fluid or mud that is introduced into the well bore while drilling the well bore through certain zones in the formation that contain, or are believed or expected to contain, significant amounts of carbonate minerals, such as shales. In certain of these embodiments, the additives of the present disclosure may inhibit dissolution of carbonate minerals in those formations and/or mitigate disintegration of drill cuttings. However, as a person of skill in the art will recognize with the benefit of this disclosure, the additives of the present disclosure may be less effective in inhibiting the dissolution of naturally-occurring carbonate in the formation in drilling fluids or muds that contain significant amounts of carbonate-based additives such as weighting agents.

The present disclosure in some embodiments provides methods for using the treatment fluids to carry out a variety of subterranean treatments, including but not limited to, hydraulic fracturing treatments, drilling operations, completion operations, and the like. Moreover, hydraulic fracturing treatments may comprise any operation that is implemented or conducted with the objective of improving the process of fracturing a well. Such includes operations that are interrelated to fracturing a primary or producing well and adjacent wells (e.g., child well-parent well relation). For instance, the effect of "bashing" a well refers to an interference created between a primary well that is undergoing fracturing and adjacent wells either also undergoing fracturing, or that have been fractured. Such effect is believed to reduce the effectiveness of the fracturing treatment due to mechanical effects. Another instance is where a producing well undergoing depletion, or lower productivity, is filled with water (pressurized), before or nearly simultaneously, and a new well is fractured, i.e., one well is used to contain the bashing effect on the adjacent well. In some embodiments, the treatment fluid such as a fracturing fluid of the present disclosure may be introduced into at least a portion of the subterranean formation at or above a pressure sufficient to create or enhance at least one fracture in the subterranean formation. In other embodiments, a treatment fluid such as a fracturing fluid of the present disclosure may be introduced at a pressure that is sufficient to maintain or hold open one or more fractures in the formation while fracturing fluids carrying proppants and/or other additives may flow into the open space of the fracture. In some embodiments, a treatment fluid of the present disclosure may be introduced after one or more fracturing operations have been substantially completed, among other reasons, to inhibit carbonate dissolution in fluids produced out of the formation and/or subsequently introduced into the formation.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, carbonate dissolution inhibiting additives of the present disclosure, and/or other optional additives) to alter the properties of the fracturing fluid. For example, the other additives 70 can be included to reduce pumping friction, to reduce or eliminate the fluid's reaction to the geological formation (e.g., carbonate dissolution) in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
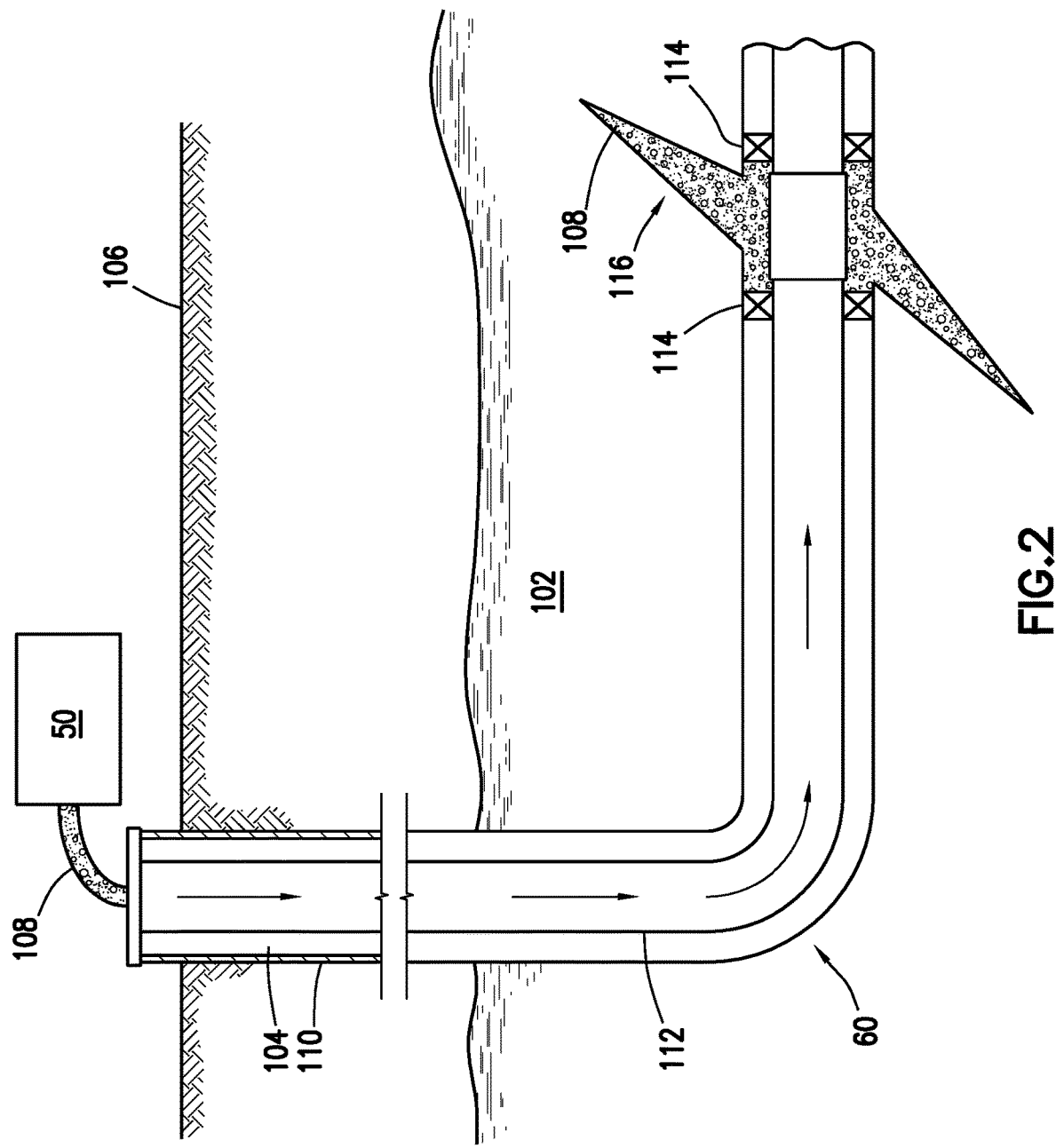
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method that comprises: providing a treatment fluid that comprises a base fluid and a carbonate dissolution inhibiting additive; contacting a portion of a carbonate-bearing subterranean formation with the treatment fluid; and allowing the carbonate dissolution inhibiting additive to chemically interact with the portion of the carbonate-bearing subterranean formation to inhibit dissolution of one or more carbonate minerals in the formation, whereby the susceptibility of at least a portion of the carbonate-bearing subterranean formation to fluid-induced damage is decreased.

In one or more embodiments described in the preceding paragraph, the carbonate dissolution inhibiting additive comprises one or more metal salts, wherein the metal is selected from the group consisting of: a Group 2 metal, a d-block transition metal, and any combination thereof. In one or more embodiments described above, the one or more metal salts are present in the treatment fluid in a concentration of from about 0.1 μM to about 1M. In one or more embodiments described above, the carbonate dissolution inhibiting additive is selected from the group consisting of: one or more phosphate additives, one or more carboxylate additives, one or more phosphonate additives, one or more phosphono additives, one or more phosphinic additives, one or more amino acid phosphonate additives; and any combination thereof. In one or more embodiments described above, the carbonate dissolution inhibiting additive are present in the treatment fluid in a concentration of from 0.05 mol/L to about 1.0 mol/L. In one or more embodiments described above, the carbonate dissolution inhibiting additive comprises one or more polymeric surface active agents. In one or more embodiments described above, the polymeric surface active agents are present in the treatment fluid in a concentration of from about 0.05 wt % to about 5 wt %. In one or more embodiments described above, the carbonate dissolution inhibiting additive comprises one or more salts in a concentration at or near the saturation point of the salt in the treatment fluid, the one or more salts selected from the group consisting of: a manganese salt, a magnesium salt, a calcium salt, a strontium salt, a barium salt, and any combination thereof. In one or more embodiments described above, the method further comprises introducing the treatment fluid into a well bore that penetrates at least the portion of the carbonate-bearing subterranean formation.

Another embodiment of the present disclosure is a method that comprises: providing a treatment fluid that comprises a base fluid and a carbonate dissolution inhibiting additive; introducing the treatment fluid into a well bore that penetrates at least a portion of a carbonate-bearing subterranean formation at or above a pressure sufficient to create or enhance one or more fractures therein; contacting a portion of the carbonate-bearing subterranean formation with the treatment fluid; and allowing the carbonate dissolution inhibiting additive to chemically interact with the portion of the carbonate-bearing subterranean formation to inhibit dissolution of one or more carbonate minerals in the formation, whereby the susceptibility of at least a portion of the carbonate-bearing subterranean formation to fluid-induced damage is decreased.

In one or more embodiments described in the preceding paragraph, the carbonate dissolution inhibiting additive comprises one or more metal salts, wherein the metal is selected from the group consisting of: a Group 2 metal, a d-block transition metal, and any combination thereof. In one or more embodiments described above, the carbonate dissolution inhibiting additive is selected from the group consisting of: one or more phosphate additives, one or more carboxylate additives, one or more phosphonate additives, one or more phosphono additives, one or more phosphinic additives, one or more amino acid phosphonate additives; and any combination thereof. In one or more embodiments described above, the carbonate dissolution inhibiting additive comprises one or more salts in a concentration at or near the saturation point of the salt in the treatment fluid, the one or more salts selected from the group consisting of: a manganese salt, a magnesium salt, a calcium salt, a strontium salt, a barium salt, and any combination thereof.

Another embodiment of the present disclosure is a method that comprises: providing a treatment fluid that comprises a base fluid and a carbonate dissolution inhibiting additive; contacting a portion of a carbonate-bearing subterranean formation with the treatment fluid, wherein the subterranean formation further comprises one or more clay materials; and allowing the carbonate dissolution inhibiting additive to chemically interact with the portion of the carbonate-bearing subterranean formation to inhibit dissolution of one or more carbonate minerals in the formation, whereby the susceptibility of at least a portion of the carbonate-bearing subterranean formation to fluid-induced damage of the one or more clay materials is decreased.

In one or more embodiments described in the preceding paragraph, the carbonate dissolution inhibiting additive comprises one or more metal salts, wherein the metal is selected from the group consisting of: a Group 2 metal, a d-block transition metal, and any combination thereof. In one or more embodiments described above, the one or more metal salts are present in the treatment fluid in a concentration of from about 0.1 µM to about 1M. In one or more embodiments described above, the carbonate dissolution inhibiting additive is selected from the group consisting of: one or more phosphate additives, one or more carboxylate additives, one or more phosphonate additives, one or more phosphono additives, one or more phosphinic additives, one or more amino acid phosphonate additives; and any combination thereof. In one or more embodiments described above, the carbonate dissolution inhibiting additive is present in the treatment fluid in a concentration of from 0.05 mol/L to about 1.0 mol/L. In one or more embodiments described above, the carbonate dissolution inhibiting additive comprises one or more polymeric surface active agents in a concentration of from about 0.05 wt % to about 5 wt %. In one or more embodiments described above, the carbonate dissolution inhibiting additive comprises one or more salts in a concentration at or near the saturation point of the salt in the treatment fluid, the one or more salts selected from the group consisting of: a manganese salt, a magnesium salt, a calcium salt, a strontium salt, a barium salt, and any combination thereof.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Example 1

Figure 3:
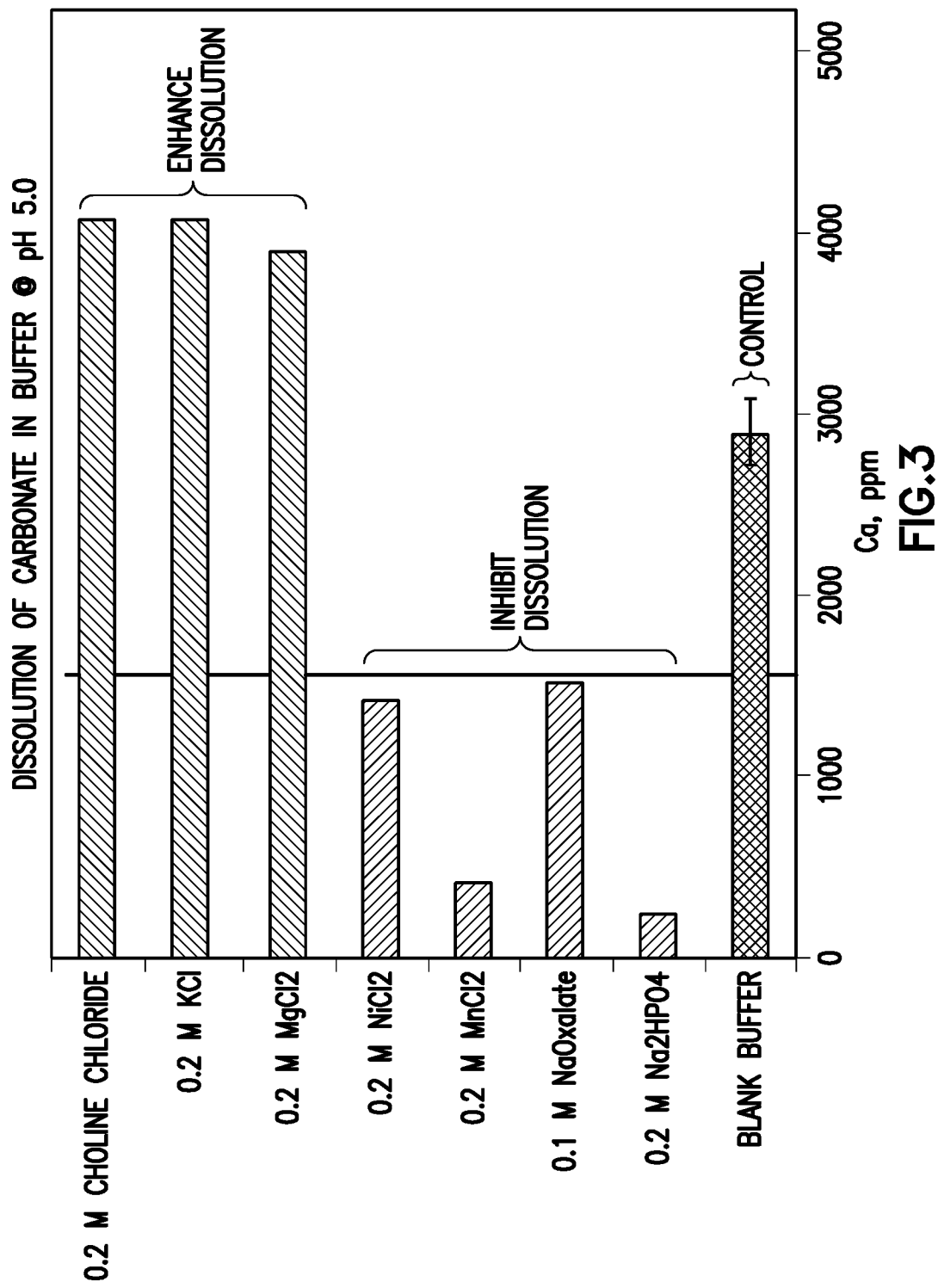
FIG. 3 is a graph illustrating data from testing of the effect of various additives on carbonate dissolution according to certain embodiments of the present disclosure.

The effectiveness of various additives to reduce the rate of dissolution of carbonates was evaluated by measuring the amount of calcium ions dissolved in an eluted fluid passed through a column packed with calcium carbonate particles having a surface area of 0.0107 $m^2/g$ at a rate of 1 mL/min. The fluids were aqueous fluids with a pH buffer to maintain a pH=5.0, and each included the additives listed in FIG. 3 in the listed concentrations. The amounts of calcium ions in the eluted fluids are plotted in FIG. 3. As shown in FIG. 3, nickel chloride, manganese chloride, sodium oxalate, and disodium hydrogen phosphate tended to inhibit the dissolution of carbonate to less than 50% of the dissolution in the control fluid, while choline chloride (0.2 M), potassium chloride (0.2 M), and magnesium chloride (0.2 M) tended to increase the dissolution of carbonate to as compared to the control fluid.

Example 2

The effectiveness of various carbonate dissolution inhibiting additives of the present disclosure in maintaining the hardness of calcium-bearing rock materials was evaluated by exposing test fluids to Mancos shale cores containing 15-20% carbonate and 20-30% clay for 24 hours in a static vessel, and measuring the Brinell hardness of the core material after exposure. Brinell hardness of a rock material is one property that may indicate the resistance of a material to indentation, and thus may indicate resistance to proppant embedment.

The test fluids comprised aqueous solutions of the additives listed in Table 1 below. The retained Brinell hardness of each of the core samples (compared to that of a core exposed to a control fluid of water) was measured according to the procedure described in ASTM E10-10 "Standard Test Method of Brinell Harness of Metallic Materials. The results of those tests are plotted in FIG. 4.

TABLE 1

| Sample No. | Additive(s) |
|---|---|
| 1 | Carbonate dissolution enhancer (2 wt %) |
| 2 | Carbonate dissolution inhibitor ($Na_2C_2O_4$) (2 wt %) |
| 3 | Clay inhibitor (0.1 wt %) + Carbonate dissolution enhancer (2 wt %) |
| 4 | Clay inhibitor (0.1 wt %) |
| 5 | Carbonate dissolution inhibitor ($MnCl_2$) (2 wt %) |
| 6 | Carbonate dissolution inhibitor ($MnCl_2$) (2 wt %) and Clay inhibitor (0.1 wt %) |

Figure 4:
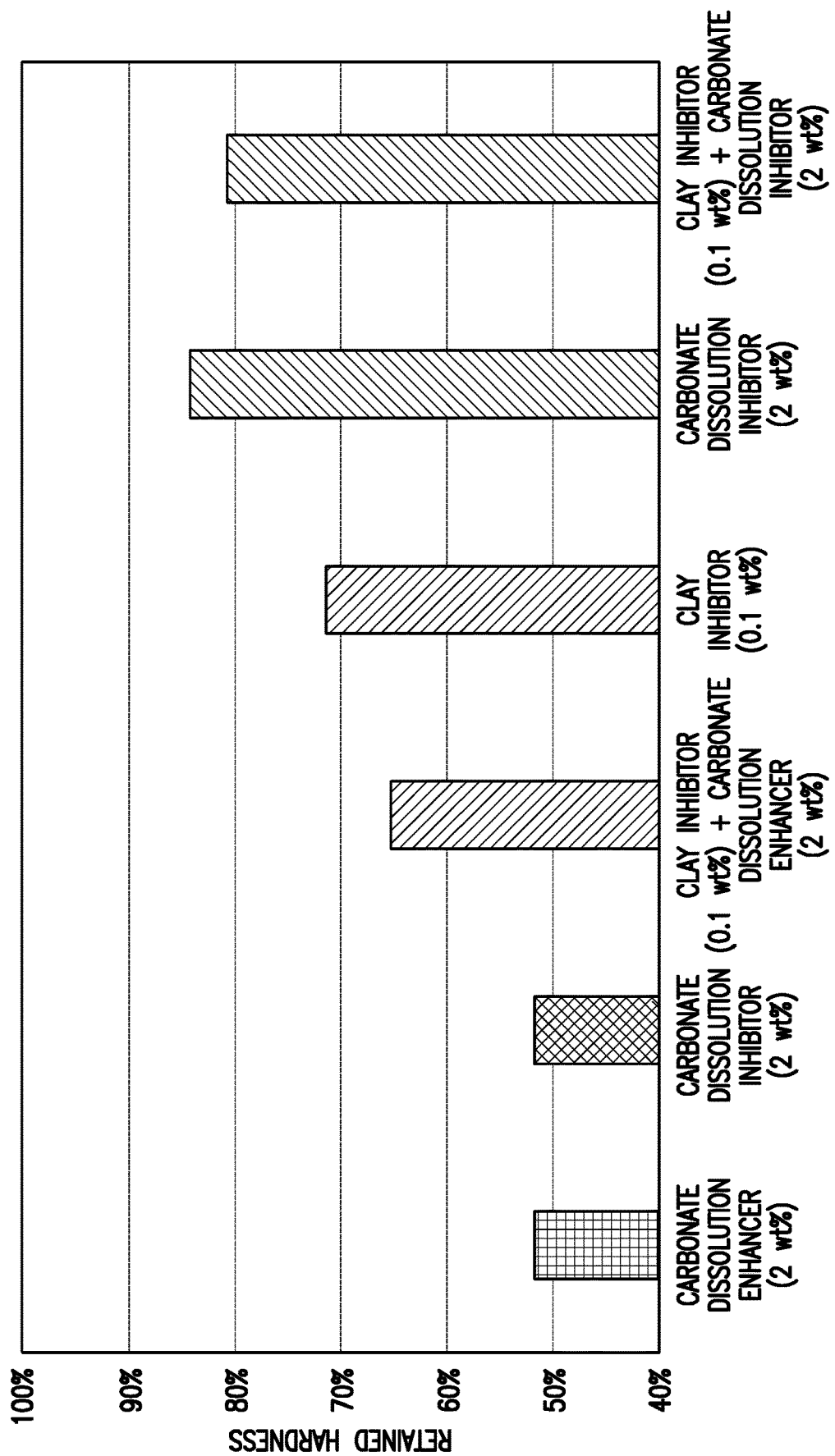
FIG. 4 is a graph illustrating data from testing of the effect of various additives on the hardness of core samples according to certain embodiments of the present disclosure.

As shown in FIG. 4, when the shale samples were treated with common clay inhibitor additives, they retained approximately 70% of their Brinell hardness. However, when treated with a combination of a clay inhibitor and a carbonate dissolution inhibitor of the present disclosure, the core samples retained more than 80% of their Brinell hardness. These results demonstrate that treatments using carbonate dissolution inhibiting additives of the present disclosure, either alone or in combination with clay inhibitor additives, may help shale or other carbonate-bearing formations retain Brinell hardness better than treatment with clay inhibitor additives alone, which may increase their resistance to proppant embedment and/or other damage. Carbonate dissolution inhibitors alone do not protect against formation softening. As shown in FIG. 4, when there is no clay hydration protection, the carbonate inhibitor and the carbonate dissolution enhancer both only retained about 52% of the Brinell hardness. When clays are protected and carbonate dissolution is inhibited then the formation retains the most Brinell hardness.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a treatment fluid that comprises a base fluid and an inorganic carbonate dissolution inhibiting additive comprising one or more metal salts in a concentration of from about 0.1 µM to about 0.2 M, wherein a cation of at least one of the one or more metal salts is a d-block transition metal;
   contacting a portion of a shale formation comprising a carbonate species present in an amount in the range of from about 0.5% to about 20% by weight with the treatment fluid; and
   chemically interacting the inorganic carbonate dissolution inhibiting additive with the portion of the shale formation to inhibit dissolution of one or more carbonate minerals in the formation wherein inhibiting dissolution of one or more carbonate minerals in the shale formation occurs by forming a crystal lattice structure on a formation face, whereby the susceptibility of at least a portion of the shale formation to fluid-inducing damage is decreased.

2. The method of claim 1 further comprising introducing the treatment fluid into a well bore that penetrates at least the portion of the shale formation.

3. The method of claim 1 wherein:
   the shale formation further comprises one or more clay materials; and
   allowing the inorganic carbonate dissolution inhibiting additive to chemically interact with the portion of the shale formation at least partially decreases the susceptibility of at least a portion of the shale formation to fluid-induced damage of the one or more clay materials.

4. A method comprising:
   providing a treatment fluid that comprises a base fluid and an inorganic carbonate dissolution inhibiting additive comprising one or more metal salts, wherein a cation of at least one of the one or more metal salts is a metal selected from the group consisting of: a Group 2 metal, a d-block transition metal, and any combination thereof;
   introducing the treatment fluid into a well bore that penetrates at least a portion of a shale formation comprising a carbonate species present in an amount in the range of from about 0.5% to about 20% by weight at or above a pressure sufficient to create or enhance one or more fractures therein;
   contacting a portion of the shale formation with the treatment fluid; and
   inhibiting dissolution of one or more carbonate minerals in the shale formation by forming on a formation face a crystal lattice structure comprising the inorganic carbonate dissolution inhibiting additive on the portion of the shale formation, whereby the susceptibility of at least a portion of the shale formation to fluid-induced damage is decreased.

5. The method of claim 4 wherein the one or more metal salts are present at a concentration at or within about 5% of the saturation point of the salt in the treatment fluid, the one or more salts selected from the group consisting of: a manganese salt, a magnesium salt, a calcium salt, a strontium salt, a barium salt, and any combination thereof.

6. The method of claim 4 wherein the metal salt is present in the treatment fluid in a concentration of from about 0.1 µM to about 1 M.

7. The method of claim 4 wherein:
   the shale formation further comprises one or more clay materials; and
   allowing the inorganic carbonate dissolution inhibiting additive to chemically interact with the portion of the shale formation at least partially decreases the susceptibility of at least a portion of the shale formation to fluid-induced damage of the one or more clay materials.

* * * * *